US006956308B2

(12) United States Patent
Binnard

(10) Patent No.: US 6,956,308 B2
(45) Date of Patent: Oct. 18, 2005

(54) DUAL FLOW CIRCULATION SYSTEM FOR A MOVER

(75) Inventor: Michael Binnard, Belmont, CA (US)

(73) Assignee: Nikon Corporation, (JP)

( * ) Notice: Subject to any disclaimer, the term of this patent is extended or adjusted under 35 U.S.C. 154(b) by 0 days.

(21) Appl. No.: 10/620,672

(22) Filed: Jul. 15, 2003

(65) Prior Publication Data

US 2005/0012403 A1 Jan. 20, 2005

(51) Int. Cl.[7] .......... H02K 9/00
(52) U.S. Cl. .......... 310/52; 310/54; 310/16
(58) Field of Search .......... 310/12–14, 16, 310/52, 54–59, 64, 65, 89

(56) References Cited

U.S. PATENT DOCUMENTS

| | | | | |
|---|---|---|---|---|
| 853,465 | A * | 5/1907 | Mershon | 318/729 |
| 3,188,833 | A * | 6/1965 | Robinson | 62/505 |
| 3,318,253 | A * | 5/1967 | Campolong | 417/367 |
| 3,789,249 | A * | 1/1974 | Purman | 310/54 |
| 3,805,101 | A * | 4/1974 | Purman | 310/54 |
| 3,852,627 | A * | 12/1974 | Davis | 310/13 |
| 3,855,485 | A | 12/1974 | Matsui et al. | |
| 3,906,261 | A * | 9/1975 | Ogura et al. | 310/12 |
| 4,018,059 | A * | 4/1977 | Hatch | 62/50.7 |
| 4,243,899 | A | 1/1981 | Jaffe | |
| 4,460,855 | A | 7/1984 | Kelly | |
| 4,565,601 | A * | 1/1986 | Kakehi et al. | 216/59 |
| 4,625,132 | A | 11/1986 | Chitayat | |
| 5,138,206 | A | 8/1992 | Schmidt | |
| 5,157,296 | A | 10/1992 | Trumper | |
| 5,196,754 | A | 3/1993 | Berthold et al. | |
| 5,294,854 | A | 3/1994 | Trumper | |
| 5,382,311 | A * | 1/1995 | Ishikawa et al. | 156/345.54 |
| 5,434,549 | A * | 7/1995 | Hirabayashi et al. | 335/229 |
| 5,622,593 | A * | 4/1997 | Arasawa et al. | 156/345.27 |
| 5,698,070 | A * | 12/1997 | Hirano et al. | 438/729 |
| 5,699,621 | A | 12/1997 | Trumper et al. | |
| 5,705,029 | A * | 1/1998 | Okudaira et al. | 438/715 |
| 5,777,403 | A * | 7/1998 | Yuan | 310/12 |
| 5,783,877 | A | 7/1998 | Chitayat | |

(Continued)

FOREIGN PATENT DOCUMENTS

EP 1124160 A2 8/2001

(Continued)

OTHER PUBLICATIONS

U.S. Appl. No. 09/139,954, filed Aug. 25, 1998, Teng et al.

*Primary Examiner*—Dang Le
(74) *Attorney, Agent, or Firm*—Steven G. Roeder; Jim Rose

(57) ABSTRACT

A circulation system (330) for a mover (328) includes a fluid source (360) that directs a first fluid (356) into a first inlet (364A) of the mover (328) and a second fluid (358) into a second inlet (366A) of the mover (328). In one embodiment, a temperature of the second fluid (358) at the second inlet (366A) is different than a temperature of the first fluid (356) at the first inlet (364A). For example, in one embodiment, the temperature of the first fluid (356) at the first inlet (364A) is at least approximately 10 degrees greater than the temperature of the second fluid (358) at the second inlet (366A). In alternative embodiments, the temperature of the first fluid (356) is at least approximately 2, 5, or 15 degrees greater than the temperature of the second fluid (358).

19 Claims, 14 Drawing Sheets

U.S. PATENT DOCUMENTS

| | | | | |
|---|---|---|---|---|
| 5,959,732 | A | 9/1999 | Hara et al. | |
| 5,998,889 | A | 12/1999 | Novak | |
| 6,069,417 | A | 5/2000 | Yuan et al. | |
| 6,084,319 | A | 7/2000 | Kamata et al. | |
| 6,114,781 | A | 9/2000 | Hazelton et al. | |
| 6,130,517 | A | 10/2000 | Yuan et al. | |
| 6,278,203 | B1 | 8/2001 | Novak et al. | |
| 6,323,567 | B1 | 11/2001 | Hazelton et al. | |
| 6,583,525 | B2 * | 6/2003 | Dyer et al. | 310/53 |

FOREIGN PATENT DOCUMENTS

| | | |
|---|---|---|
| JP | 05-45102 | 8/1989 |
| JP | 06-062786 | 1/1993 |
| JP | 05-262222 | 10/1993 |
| JP | 10-313566 | 11/1998 |
| JP | 2001-025227 | 1/2001 |
| JP | 2001-275334 | 10/2001 |
| JP | 2002-10618 | 1/2002 |

* cited by examiner

DUAL FLOW CIRCULATION SYSTEM FOR A MOVER

FIELD OF THE INVENTION

The present invention relates to a circulation system for a mover. The circulation system can be used to control the temperature of the mover and/or to control the thermal influence of the mover on the surrounding environment and the surrounding components.

BACKGROUND

Exposure apparatuses for semiconductor processing are commonly used to transfer images from a reticle onto a semiconductor wafer. Typically, the exposure apparatus utilizes one or more movers to precisely position a reticle stage retaining the reticle and a wafer stage holding the semiconductor wafer. Additionally, the exposure apparatus can include a vibration isolation system that includes one or more movers. The images transferred onto the wafer from the reticle are extremely small. Accordingly, the precise positioning of the wafer and the reticle is critical to the manufacturing of the wafer. In order to obtain precise relative alignment, the position of the reticle and the wafer are constantly monitored by a measurement system. Subsequently, with the information from the measurement system, the reticle and/or wafer are moved by the one or more movers to obtain relative alignment.

One type of mover is a linear motor that includes a pair of spaced apart magnet arrays that generate a magnetic field and a conductor array positioned between the magnet arrays. An electrical current is directed to the conductor array. The electrical current supplied to the conductor array generates an electromagnetic field that interacts with the magnetic field of the magnet arrays. This causes the conductor array to move relative to the magnet arrays. When the conductor array is secured to one of the stages, that stage moves in concert with the conductor array.

Unfortunately, the electrical current supplied to the conductor array also generates heat, due to resistance in the conductor array. Most linear movers are not actively cooled. Thus, the heat from the conductor array is subsequently transferred to the surrounding environment, including the air surrounding the linear motor and the other components positioned near the linear motor. The heat changes the index of refraction of the surrounding air. This reduces the accuracy of the measurement system and degrades machine positioning accuracy. Further, the heat causes expansion of the other components of the machine. This further degrades the accuracy of the machine. Moreover, the resistance of the conductor increases as temperature increases. This exacerbates the heating problem and reduces the performance and life of the linear motor.

In light of the above, there is a need for a system and method for maintaining an outer surface of a mover at a set temperature during operation. Additionally, there is a need for a system for cooling a conductor array of a mover. Moreover, there is a need for an exposure apparatus capable of manufacturing precision devices such as high density semiconductor wafers.

SUMMARY

The present invention is directed to a circulation system for a mover. The mover includes a first passageway having a first inlet, and a second passageway having a second inlet.

The circulation system includes a fluid source that directs a first fluid into the first inlet and a second fluid into the second inlet. In one embodiment, a temperature of the second fluid at the second inlet is different than a temperature of the first fluid at the first inlet.

For example, in one embodiment, the temperature of the first fluid at the first inlet is at least approximately 5 degrees Celsius greater than the temperature of the second fluid at the second inlet. In alternative embodiments, the temperature of the first fluid at the first inlet is at least approximately 10, 20, or 30 degrees Celsius greater than the temperature of the second fluid at the second inlet.

The circulation system can be used with a linear motor, a non-commutated voice coil mover, a planar motor, or another type of actuator.

The present invention is also directed to a mover combination that includes (i) a mover having a magnet component and a conductor component and (ii) the circulation system described above. In one embodiment, the mover is positioned in a room that is at a room temperature, and the temperature of the first fluid at the first inlet is controlled to be approximately equal to the room temperature. For example, the room temperature can be between approximately 20 and 25 degrees C. In another embodiment, the flow rate of the second fluid is greater than the flow rate of the first fluid.

The conductor component can include a conductor housing and a circulation housing that cooperates with the conductor housing to define at least one of the passageways. In one embodiment, the first passageway encircles at least a portion of the second passageway and is substantially coaxial with the second passageway. Further, the first passageway encircles at least a portion of the conductor housing and the conductor housing encircles at least a portion of the second passageway.

The present invention is also directed to (i) an isolation system including the mover combination, (ii) a stage assembly including the mover combination, (iii) an exposure apparatus including the mover combination, and (iv) an object or wafer on which an image has been formed by the exposure apparatus. Further, the present invention is also directed to (i) a method for making a circulation system, (ii) a method for making a mover combination, (iii) a method for making a stage assembly, (iv) a method for manufacturing an exposure apparatus, and (v) a method for manufacturing an object or a wafer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
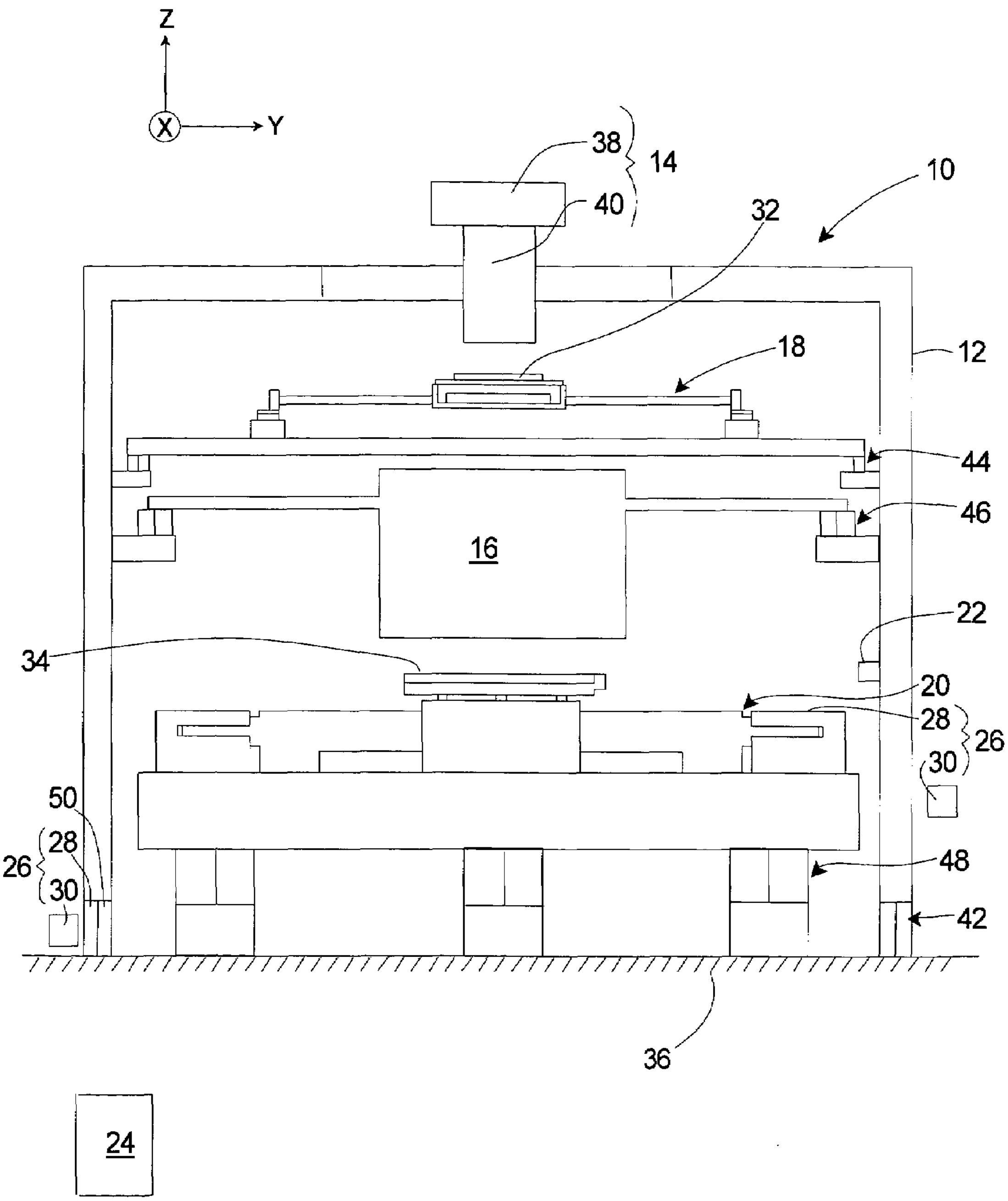
FIG. 1 is a schematic illustration of an exposure apparatus having features of the present invention.

FIG. 1 is a schematic illustration of a precision assembly, namely an exposure apparatus 10 having features of the present invention. The exposure apparatus 10 includes an apparatus frame 12, an illumination system 14 (irradiation apparatus), an optical assembly 16, a reticle stage assembly 18, a wafer stage assembly 20, a measurement system 22, and a control system 24. The design of the components of the exposure apparatus 10 can be varied to suit the design requirements of the exposure apparatus 10.

As provided herein, one or both of the stage assemblies 18, 20 can include a mover combination 26 having one or more movers 28 and one or more circulation systems 30 (illustrated as a box in FIG. 1). In one embodiment, the circulation system 30 reduces the amount of heat transferred from the one or more movers 28 to the surrounding environment. With this design, the movers 28 can be placed closer to the measurement system 22 and/or the influence of the movers 28 on the accuracy of the measurement system 22 is reduced. Further, the exposure apparatus 10 is capable of manufacturing higher precision devices, such as higher density, semiconductor wafers.

A number of Figures include an orientation system that illustrates an X axis, a Y axis that is orthogonal to the X axis and a Z axis that is orthogonal to the X and Y axes. It should be noted that these axes can also be referred to as the first, second and third axes.

The exposure apparatus 10 is particularly useful as a lithographic device that transfers a pattern (not shown) of an integrated circuit from a reticle 32 onto a semiconductor wafer 34. The exposure apparatus 10 mounts to a mounting base 36, e.g., the ground, a base, or floor or some other supporting structure.

There are a number of different types of lithographic devices. For example, the exposure apparatus 10 can be used as a scanning type photolithography system that exposes the pattern from the reticle 32 onto the wafer 34 with the reticle 32 and the wafer 34 moving synchronously. In a scanning type lithographic device, the reticle 32 is moved perpendicularly to an optical axis of the optical assembly 16 by the reticle stage assembly 18 and the wafer 34 is moved perpendicularly to the optical axis of the optical assembly 16 by the wafer stage assembly 20. Scanning of the reticle 32 and the wafer 34 occurs while the reticle 32 and the wafer 34 are moving synchronously.

Alternatively, the exposure apparatus 10 can be a step-and-repeat type photolithography system that exposes the reticle 32 while the reticle 32 and the wafer 34 are stationary. In the step and repeat process, the wafer 34 is in a constant position relative to the reticle 32 and the optical assembly 16 during the exposure of an individual field. Subsequently, between consecutive exposure steps, the wafer 34 is consecutively moved with the wafer stage assembly 20 perpendicularly to the optical axis of the optical assembly 16 so that the next field of the wafer 34 is brought into position relative to the optical assembly 16 and the reticle 32 for exposure. Following this process, the images on the reticle 32 are sequentially exposed onto the fields of the wafer 34, and then the next field of the wafer 34 is brought into position relative to the optical assembly 16 and the reticle 32.

However, the use of the exposure apparatus 10 provided herein is not limited to a photolithography system for semiconductor manufacturing. The exposure apparatus 10, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern from a mask to a substrate with the mask located close to the substrate without the use of a lens assembly.

The apparatus frame 12 is rigid and supports the components of the exposure apparatus 10. The apparatus frame 12 illustrated in FIG. 1 supports the reticle stage assembly 18, the optical assembly 16 and the illumination system 14 above the mounting base 36.

The illumination system 14 includes an illumination source 38 and an illumination optical assembly 40. The illumination source 38 emits a beam (irradiation) of light energy. The illumination optical assembly 40 guides the beam of light energy from the illumination source 38 to the optical assembly 16. The beam illuminates selectively different portions of the reticle 32 and exposes the wafer 34. In FIG. 1, the illumination source 38 is illustrated as being supported above the reticle stage assembly 18. Typically, however, the illumination source 38 is secured to one of the sides of the apparatus frame 12 and the energy beam from the illumination source 38 is directed to above the reticle stage assembly 18 with the illumination optical assembly 40.

The illumination source 38 can be a g-line source (436 nm), an i-line source (365 nm), a KrF excimer laser (248 nm), an ArF excimer laser (193 nm) or a $F_2$ laser (157 nm). Alternatively, the illumination source 38 can generate charged particle beams such as an x-ray or an electron beam. For instance, in the case where an electron beam is used, thermionic emission type lanthanum hexaboride ($LaB_6$) or tantalum (Ta) can be used as a cathode for an electron gun. Furthermore, in the case where an electron beam is used, the structure could be such that either a mask is used or a pattern can be directly formed on a substrate without the use of a mask.

The optical assembly 16 projects and/or focuses the light passing through the reticle 32 to the wafer 34. Depending upon the design of the exposure apparatus 10, the optical assembly 16 can magnify or reduce the image illuminated on the reticle 32. The optical assembly 16 need not be limited to a reduction system. It could also be a 1× or magnification system.

When far ultra-violet rays such as the excimer laser is used, glass materials such as quartz and fluorite that transmit far ultra-violet rays can be used in the optical assembly 16. When the $F_2$ type laser or x-ray is used, the optical assembly 16 can be either catadioptric or refractive (a reticle should also preferably be a reflective type), and when an electron beam is used, electron optics can consist of electron lenses and deflectors. The optical path for the electron beams should be in a vacuum.

Also, with an exposure device that employs vacuum ultra-violet radiation (VUV) of wavelength 200 nm or lower, use of the catadioptric type optical system can be considered. Examples of the catadioptric type of optical system include the disclosure Japan Patent Application Disclosure No. 8-171054 published in the Official Gazette for Laid-Open Patent Applications and its counterpart U.S. Pat. No. 5,668,672, as well as Japan Patent Application Disclosure No.10-20195 and its counterpart U.S. Pat. No. 5,835,275. In these cases, the reflecting optical device can be a catadioptric optical system incorporating a beam splitter and concave mirror. Japan Patent Application Disclosure No. 8-334695 published in the Official Gazette for Laid-Open Patent Applications and its counterpart U.S. Pat. No. 5,689,377 as well as Japan Patent Application Disclosure No.10-3039 and its counterpart U.S. patent application Ser. No. 873,605 (Application Date: Jun. 12, 1997) also use a reflecting/refracting type of optical system incorporating a concave mirror, etc., but without a beam splitter, and can also be employed with this invention. As far as is permitted, the disclosures in the above-mentioned U.S. patents, as well as the Japan patent applications published in the Official Gazette for Laid-Open Patent Applications are incorporated herein by reference.

The reticle stage assembly 18 holds and positions the reticle 32 relative to the optical assembly 16 and the wafer 34. Somewhat similarly, the wafer stage assembly 20 holds and positions the wafer 34 with respect to the projected image of the illuminated portions of the reticle 32. The wafer stage assembly 20 is described in more detail below.

Further, in photolithography systems, when linear motors (see U.S. Pat. Nos. 5,623,853 or 5,528,118) are used in a wafer stage or a mask stage, the linear motors can be either an air levitation type employing air bearings or a magnetic levitation type using Lorentz force or reactance force. Additionally, the stage could move along a guide, or it could be a guideless type stage that uses no guide. As far as is permitted, the disclosures in U.S. Pat. Nos. 5,623,853 and 5,528,118 are incorporated herein by reference.

Alternatively, one of the stages could be driven by a planar motor, which drives the stage by an electromagnetic force generated by a magnet unit having two-dimensionally arranged magnets and an armature coil unit having two-dimensionally arranged coils in facing positions. With this type of driving system, either the magnet unit or the armature coil unit is connected to the stage and the other unit is mounted on the moving plane side of the stage.

Movement of the stages as described above generates reaction forces that can affect performance of the photolithography system. Reaction forces generated by the wafer (substrate) stage motion can be mechanically transferred to the floor (ground) by use of a frame member as described in U.S. Pat. No. 5,528,100 and published Japanese Patent Application Disclosure No. 8-136475. Additionally, reaction forces generated by the reticle (mask) stage motion can be mechanically transferred to the floor (ground) by use of a frame member as described in U.S. Pat. No. 5,874,820 and published Japanese Patent Application Disclosure No. 8-330224. As far as is permitted, the disclosures in U.S. Pat. Nos. 5,528,100 and 5,874,820 and Japanese Patent Application Disclosure No. 8-330224 are incorporated herein by reference.

The measurement system 22 monitors movement of the reticle 32 and the wafer 34 relative to the optical assembly 16 or some other reference. With this information, the control system 24 can control the reticle stage assembly 18 to precisely position the reticle 32 and the wafer stage assembly 20 to precisely position the wafer 34. For example, the measurement system 22 can utilize multiple laser interferometers, encoders, and/or other measuring devices.

The control system 24 is connected to the measurement system 22 and receives information from the measurement system 22 and controls the stage mover assemblies 18, 20 to precisely position the reticle 32 and the wafer 34. Further, the control system 24 is connected to the circulation system(s) 30 and controls the circulation system(s) 30 to control the temperature of the mover(s) 28. The control system 24 can include one or more processors and circuits for performing the functions described herein.

Additionally, the exposure apparatus 10 can include one or more isolation systems that include a mover combination 26 having features of the present invention. For example, in FIG. 1, the exposure apparatus 10 includes (i) a frame isolation system 42 that secures the apparatus frame 12 to the mounting base 36 and reduces the effect of vibration of the mounting base 36 causing vibration to the apparatus frame 12, (ii) a reticle stage isolation system 44 that secures and supports the reticle stage assembly 18 to the apparatus frame 12 and reduces the effect of vibration of the apparatus frame 12 causing vibration to the reticle stage assembly 18, (iii) an optical isolation system 46 that secures and supports the optical assembly 16 to the apparatus frame 12 and reduces the effect of vibration of the apparatus frame 12 causing vibration to the optical assembly 16, and (iv) a wafer stage isolation system 48 that secures and supports the wafer stage assembly 20 to the mounting base 36 and reduces the effect of vibration of the mounting base 36 causing vibration to the wafer stage assembly 20. In this embodiment, each isolation system 42–48 can include (i) one or more pneumatic cylinders 50 that isolate vibration, and/or (ii) one or more mover combinations 26 made pursuant to the present invention that isolate vibration and control the position of the respective apparatus.

A photolithography system (an exposure apparatus) according to the embodiments described herein can be built by assembling various subsystems, including each element listed in the appended claims, in such a manner that prescribed mechanical accuracy, electrical accuracy, and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems. Once a photolithography system is assembled using the various subsystems, a total adjustment is performed to make sure that accuracy is maintained in the complete photolithography system. Additionally, it is desirable to manufacture an exposure system in a clean room where the temperature and cleanliness are controlled.

Figure 2:
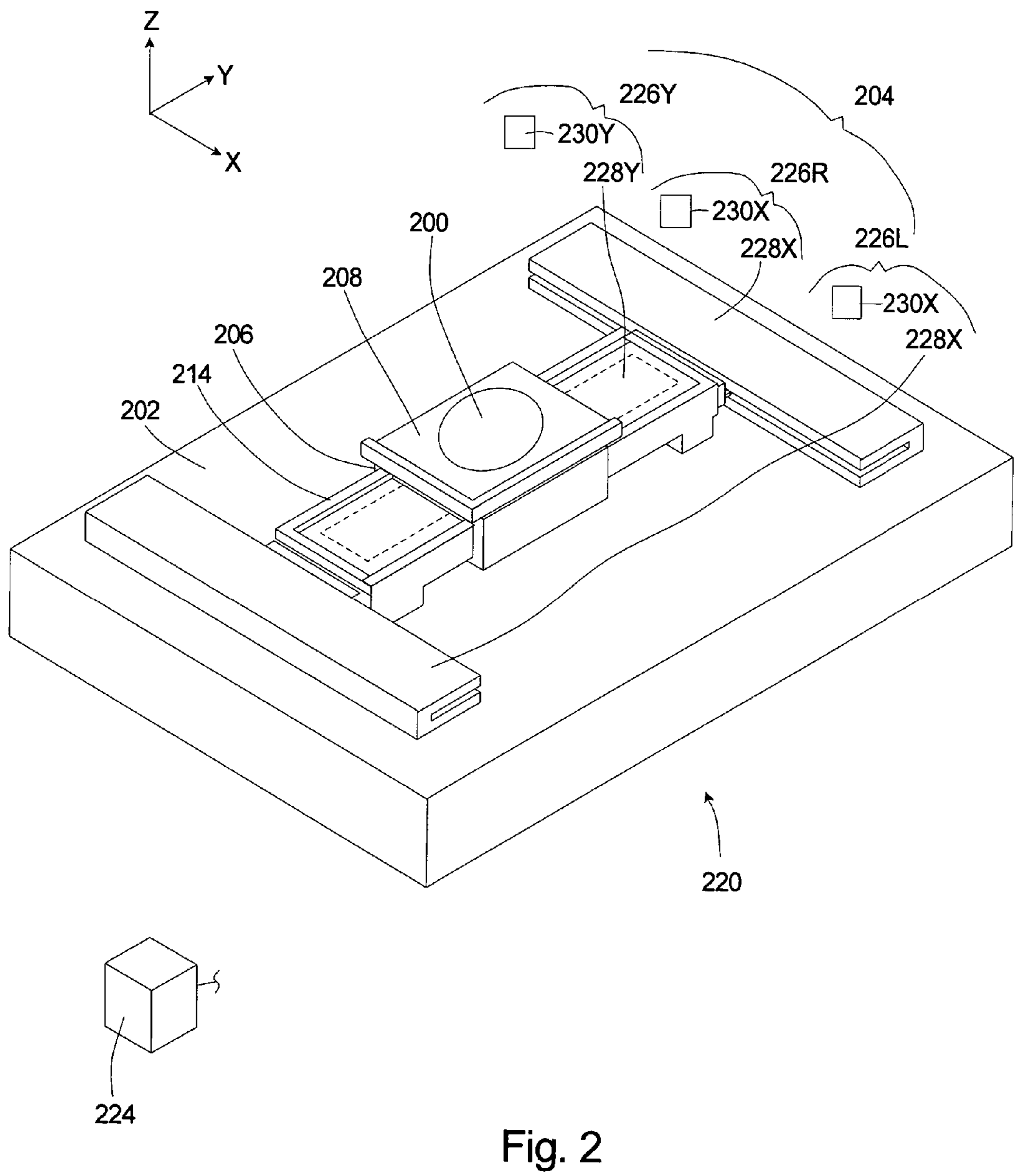
FIG. 2 is a perspective view of a stage assembly including a plurality of mover assemblies having features of the present invention.

FIG. 2 is a perspective view of a control system 224 and a stage assembly 220 that is used to position a device 200. For example, the stage assembly 220 can be used as the wafer stage assembly 20 in the exposure apparatus 10 of FIG. 1. In this embodiment, the stage assembly 220 would position the wafer 34 (illustrated in FIG. 1) during manufacturing of the semiconductor wafer 34. Alternatively, the stage assembly 220 can be used to move other types of devices 200 during manufacturing and/or inspection, to move a device under an electron microscope (not shown), or to move a device during a precision measurement operation (not shown). For example, the stage assembly 220 could be designed to function as the reticle stage assembly 18.

The stage assembly 220 includes a stage base 202, a stage mover assembly 204, a stage 206, and a device table 208. The design of the components of the stage assembly 220 can be varied. For example, in FIG. 2, the stage assembly 220 includes one stage 206. Alternatively, however, the stage assembly 220 could be designed to include more than one stage 206.

In FIG. 2, the stage base 202 is generally rectangular shaped. Alternatively, the stage base 202 can be another shape. The stage base 202 supports some of the components of the stage assembly 220 above the mounting base 36.

The stage mover assembly 204 controls and moves the stage 206 and the device table 208 relative to the stage base 202. For example, the stage mover assembly 204 can move the stage 206 with three degrees of freedom, less than three degrees of freedom, or six degrees of freedom relative to the stage base 202. The stage mover assembly 204 can include one or more movers, such as rotary motors, voice coil motors, linear motors utilizing a Lorentz force to generate drive force, electromagnetic movers, planar motor, or some other force movers.

In FIG. 2, the stage mover assembly 204 includes a left X stage mover combination 226L, a right X stage mover combination 226R, a guide bar 214, and a Y stage mover combination 226Y. Each X stage mover combination 226L, 226R includes an X mover 228X and an X circulation system 230X (illustrated as a box); and the Y stage mover combination 226Y includes a Y mover 228Y and a Y circulation system 230Y (illustrated as a box).

The X movers 228X move the guide bar 214, the stage 206 and the device table 208 with a relatively large displacement along the X axis and with a limited range of motion about the Z axis, and the Y mover 228Y moves the stage 206 and the device table 208 with a relatively large displacement along the Y axis relative to the guide bar 214.

The design of each mover 228X, 228Y can be varied to suit the movement requirements of the stage assembly 220. For example, each of the movers 228X, 228Y can include one or more rotary motors, voice coil motors, linear motors utilizing a Lorentz force to generate drive force, electromagnetic movers, or some other force movers. In the embodiment illustrated in FIG. 2, each of the movers 228X, 228Y is a linear motor.

In one embodiment, (i) for each X stage mover combination 226L, 226R, the X circulation system 230X can be used to reduce the amount of heat transfer from the respective X mover 228X to the surrounding environment; and/or (ii) the Y circulation system 230Y can be used to reduce the amount of heat transfer from the Y mover 228Y to the surrounding environment.

The guide bar 214 guides the movement of the stage 206 along the Y axis. In FIG. 2, the guide bar 214 is somewhat rectangular beam shaped. A bearing (not shown) maintains the guide bar 214 spaced apart along the Z axis relative to the stage base 202 and allows for motion of the guide bar 214 along the X axis and about the Z axis relative to the stage base 202. The bearing can be a vacuum preload type fluid bearing that maintains the guide bar 214 spaced apart from the stage base 202 in a non-contact manner. Alternatively, for example, a magnetic type bearing or a ball bearing type assembly could be utilized that allows for motion of the guide bar 214 relative to the stage base 202.

In FIG. 2, the stage 206 moves with the guide bar 214 along the X axis and about the Z axis and the stage 206 moves along the Y axis relative to the guide bar 214. In this embodiment, the stage 206 is generally rectangular shaped and includes a rectangular shaped opening for receiving the guide bar 214. A bearing (not shown) maintains the stage 206 spaced apart along the Z axis relative to the stage base 202 and allows for motion of the stage 206 along the X axis, along the Y axis and about the Z axis relative to the stage base 202. The bearing can be a vacuum preload type fluid bearing that maintains the stage 206 spaced apart from the stage base 202 in a non-contact manner. Alternatively, for example, a magnetic type bearing or a ball bearing type assembly could be utilized that allows for motion of the stage 206 relative to the stage base 202.

Further, the stage 206 is maintained apart from the guide bar 214 with opposed bearings (not shown) that allow for motion of the stage 206 along the Y axis relative to the guide bar 214, while inhibiting motion of the stage 206 relative to the guide bar 214 along the X axis and about the Z axis. Each bearing can be a fluid bearing that maintains the stage 206 spaced apart from the guide bar 214 in a non-contact manner. Alternatively, for example, a magnetic type bearing or a ball bearing type assembly could be utilized that allows for motion of the stage 206 relative to the guide bar 214.

In the embodiment illustrated in the FIG. 2, the device table 208 is generally rectangular plate shaped and includes a clamp that retains the device 200. Further, the device table 208 is fixedly secured to the stage 206 and moves concurrently with the stage 206. Alternatively, for example, the stage mover assembly 204 can include a table mover assembly (not shown) that moves and adjusts the position of the device table 208 relative to the stage 206. For example, the table mover assembly can adjust the position of the device table 208 relative to the stage 206 with six degrees of freedom. Alternatively, for example, the table mover assembly can move the device table 208 relative to the stage 206 with only three degrees of freedom.

Figure 3A:
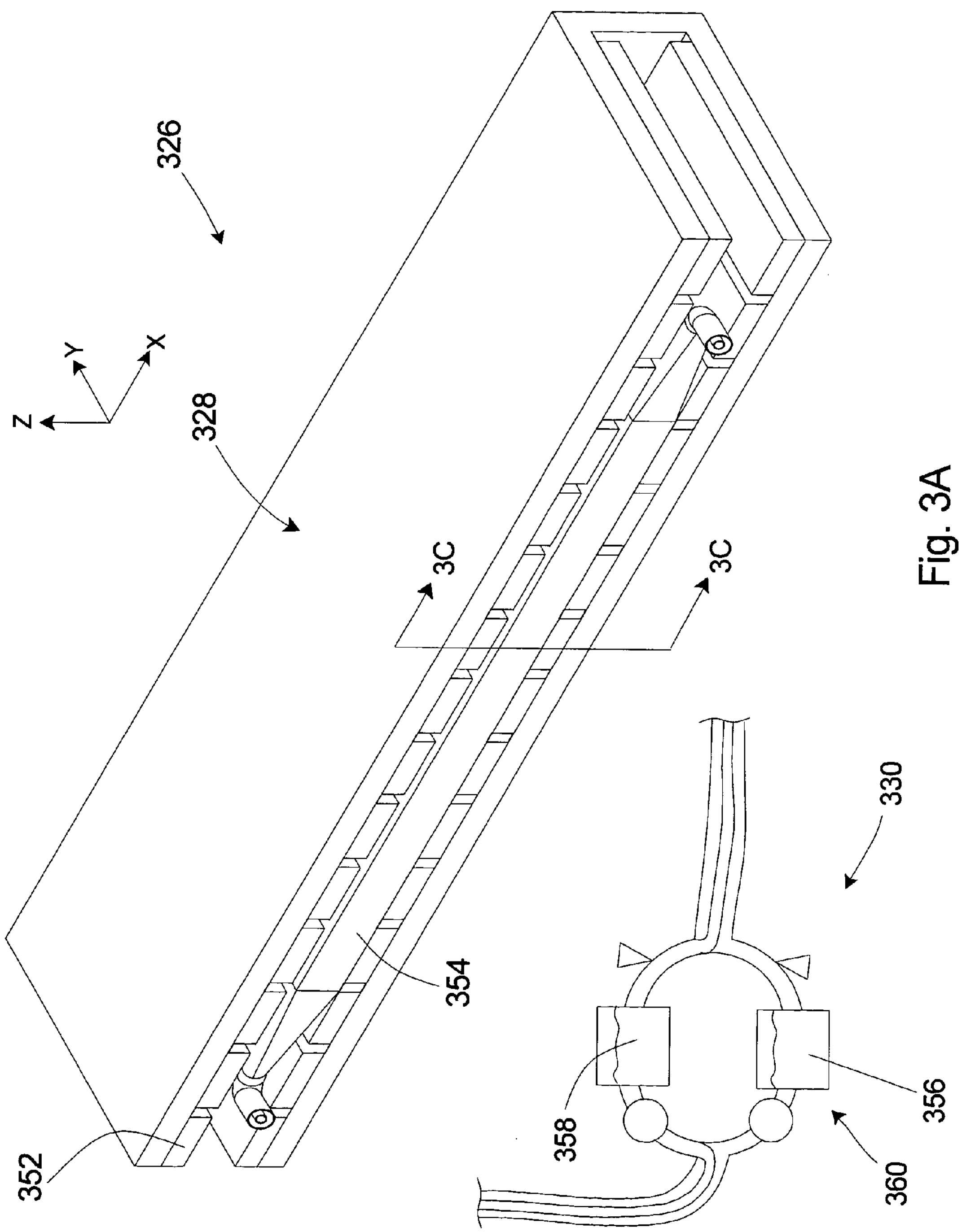
FIG. 3A is a perspective view of a mover assembly having features of the present invention.

FIG. 3A is a perspective view of a mover combination 326 having features of the present invention. The mover combination 326, for example, can be used in one of the stage assemblies 18, 20, 220 (illustrated in FIGS. 1 and 2), or one of the isolation systems 42–48 (illustrated in FIG. 1). Alternatively, the mover combination 326 can be used to move or position another type of device or object during a manufacturing, measurement and/or inspection process.

In FIG. 3A, the mover combination 326 includes one mover 328 and one circulation system 330. Alternatively, for example, the motor combination 326 can include two or more movers 328 and/or two of more circulation systems 330. The design of each of these components can be varied to suit the requirement of the mover combination 326.

FIG. 3A illustrates a first embodiment of the mover 328. In this embodiment, the mover 328 is a linear motor and includes a magnet component 352, and a conductor component 354 that interacts with the magnet component 352. The design of these components can be varied. In FIG. 3A, the conductor component 354 moves linearly along the X axis relative to the stationary magnet component 352. Alternatively, for example, the mover 328 could be designed so that the magnet component 352 moves relative to a stationary conductor component 354.

The circulation system 330 directs a first fluid 356 and a second fluid 358 to the mover 328. With this design, in one embodiment, the circulation system 330 can be used to reduce the amount of heat transferred from the mover 328 to the environment that surrounds the mover 328. In one embodiment, the circulation system can be used to maintain a portion or the entire outer surface of the mover 328 and/or the conductor component 354 at a set temperature. This reduces the influence of the mover 328 on the temperature of the environment surrounding the mover 328 and allows for more accurate positioning by the mover 328.

In one embodiment, the circulation system 330 includes a fluid source 360 that directs the first fluid 356 and the second fluid 358 separately and independently to the mover 328.

Figure 3B:
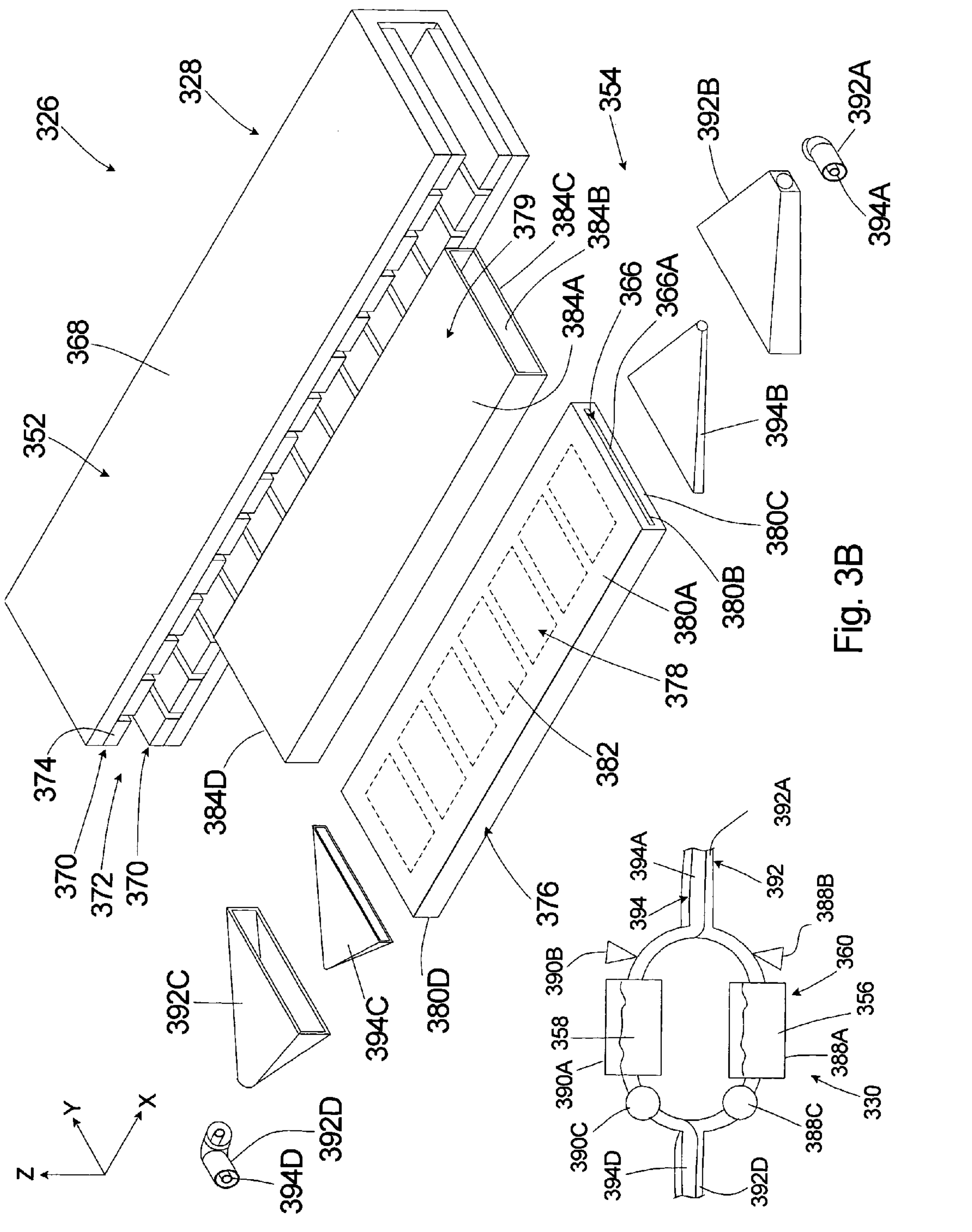
FIG. 3B is an exploded perspective view of the mover assembly of FIG. 3A.

FIG. 3B illustrates an exploded perspective view of the mover combination 326 of FIG. 3A. As an overview, in this embodiment, the mover 328 includes (i) a first passageway 364 (illustrated in FIG. 3D) having a first inlet 364A and a first outlet 364B, and (ii) a second passageway 366 having a second inlet 366A and a second outlet 366B (illustrated in FIG. 3D). The location of the passageways 364, 366 can be varied. In this embodiment, both passageways 364, 366 are located in the conductor component 354.

In this embodiment, the magnet component 352 includes a yoke 368 and one or more spaced apart magnet arrays 370. In FIG. 3B, the yoke 368 is somewhat rectangular "C" shaped and includes a generally rectangular shaped top wall, a generally rectangular shaped bottom wall and a generally rectangular rear wall that maintains the top wall spaced apart from and substantially parallel with the bottom wall. In one embodiment, the yoke 368 is made of a magnetically permeable material, such as iron. The magnetically permeable material provides some shielding of the magnetic fields generated by the magnet array(s) 370, as well as providing a low reluctance magnetic flux return path for the magnetic fields of the magnet array(s) 370.

The number and design of magnet arrays 370 can be varied. For example, in FIG. 3B, the magnet component 352 includes two spaced apart magnet arrays 370 that are spaced apart by a magnet gap 372. One of the magnet arrays 370 is secured to the top wall and the other magnet array 370 is secured to the bottom wall. Alternatively, for example, the motor could be designed with a single magnet array 370.

Each of the magnet arrays 370 includes one or more magnets 374. The positioning and the number of magnets 374 in each magnet array 370 can be varied. For example, in FIG. 3B, each magnet array 370 includes a plurality of rectangular shaped magnets 374 that are aligned side-by-side. The magnets 374 in each magnet array 370 are orientated so that the poles alternate between the North pole and the South pole. Stated another way, the magnets 374 in each magnet array 370 are arranged with alternating magnetic polarities. Further, the polarities of opposed magnets in the two magnet arrays 370 are opposite. This leads to strong magnetic fields in the magnet gap 372 and strong force generation of the mover 328. In one embodiment, each of the magnets 374 is made of a high energy product, rare earth, permanent magnetic material such as NdFeB. Alternatively, for example, each magnet 374 can be made of a low energy product, ceramic magnet or other type of material that generates a magnetic field.

The conductor component 354 moves along the X axis in the magnet gap 372 between the magnet arrays 370. The conductor component 354 includes a coil assembly 376 that contains one or more conductor arrays 378 (illustrated in phantom in FIG. 3B), and a circulation housing 379. In FIG. 3B, the coil assembly 376 is somewhat rectangular tube shaped and includes an outer perimeter 380A, an inner perimeter 380B, a first end 380C, and an opposed second end 380D.

In FIG. 3B, the conductor component 354 includes two conductor arrays 378 each having one or more spaced apart coils (conductors) 382 (illustrated in phantom). In one embodiment, each coil 382 is generally rectangular shaped. Each conductor 382 is made of metal such as copper or any substance or material responsive to electrical current and capable of creating a magnetic field. The conductors 382 can be made of wire encapsulated in an epoxy that defines the coil assembly 376. A gap between the two conductor arrays defines the inner perimeter 380B.

Alternatively, for example, the conductor component 354 could include a pair of spaced apart conductor arrays that are positioned on opposite sides of a single magnet array.

The circulation housing 379 cooperates with the coil assembly 376 to define at least one of the passageways 364, 366. In FIG. 3B, the circulation housing 379 is generally rectangular tube shaped, encircles the coil assembly 376, is generally the same length as the coil assembly 376, and includes (i) an outer perimeter 384A, (ii) an inner perimeter 384B, (iii) a first end 384C and (iv) an opposed second end 384D. In this embodiment, the circulation housing 379 cooperates with the coil assembly 376 to define the first passageway 364. Stated another way, the space between the inner perimeter 384B of the circulation housing 379 and the outer perimeter 380A of the coil assembly 376 defines the first passageway 364. Further, the second passageway 366 is defined by the opening in the coil assembly 376. Alternatively, for example, the circulation housing 379 can include a tubular shaped internal liner (not shown) that also encloses the outer perimeter 380A of the coil assembly 376, so that both passageways 364, 366 are outside the coil assembly 376.

In one embodiment, the circulation housing 379 is made from a non-electrically conductive, non-magnetic material, such as low electrical conductivity stainless steel or titanium, or non-electrically conductive plastic or ceramic.

The conductor component 354 can include one or more supports (not shown) that support the circulation housing 379 spaced apart from the coil assembly 376. This reduces heat transfer between the coil assembly 376 and the circulation housing 379 and helps to define the first passageway 364.

The control system 24 (illustrated in FIG. 1) is connected to the mover 28 (stage mover assembly 204) and directs and controls electrical current to the conductors 382. The electrical current in the conductors 382 interacts with the magnetic fields that surround the magnets 374 in the magnet arrays 370. When electric current flows in the conductors 382, a Lorentz type force is generated in a direction mutually perpendicular to the direction of the wires of the conductors 382 and the magnetic field of the magnets 374. This force can be used to move one of the components 352, 354 relative to the other component 354, 352.

The design of the circulation system 330 can vary. In FIG. 3B, the circulation system 330 directs the first fluid 356 through the first passageway 364 around the outer perimeter 380A of the coil assembly 376 and the second fluid 358 through the second passageway 366 within the coil assembly 376. With this design, in one embodiment, the circulation system 330 can be used to inhibit the transfer of heat from the conductor component 354 and the mover 328.

As outlined above, the circulation system 330 includes the fluid source 360 that directs the first fluid 356 through the first passageway 364 and the second fluid 358 through the second passageway 366. The design of the fluid source 360 can vary. In one embodiment, the fluid source 360 includes a first reservoir 388A that retains the first fluid 356, a first fluid pump 388B in fluid communication with the first reservoir 388A, a first temperature adjuster 388C in fluid communication with the first reservoir 388A, a second reservoir 390A that retains the second fluid 358, a second fluid pump 390B in fluid communication with the second reservoir 390A, and a second temperature adjuster 390C in fluid communication with the second reservoir 390A.

The first fluid pump 388B controls the flow rate and pressure of the first fluid 356 that is directed to the mover 328. The first temperature adjuster 388C adjusts and controls the temperature of the first fluid 356 that is directed to the mover 328. The first temperature adjuster 388C can be a heat exchanger, such as a chiller unit. The second fluid pump 390B controls the flow rate and pressure of the second fluid 358 that is directed to the mover 328. The second temperature adjuster 390C adjusts and controls the temperature of the second fluid 358 that is directed to the mover 328. The second temperature adjuster 390C can be a heat exchanger, such as a chiller unit.

In one embodiment, the temperature, flow rate, and type of the first fluid 356 is selected and controlled and the temperature, flow rate, and type of the second fluid 358 is selected and controlled to precisely control the temperature of the outer surface 384A of the circulation housing 379, the conductor component 354 and/or the mover 328. In one embodiment, each fluid 356, 358 is Flourinert type FC-77, made by 3M Company in Minneapolis, Minn.

In one embodiment, the flow rates and temperatures of the fluids 356, 358 are controlled to maintain the outer surface 384A of the conductor component 354 at a predetermined temperature. By controlling the temperature of the outer surface of the conductor component 354, the amount of heat transferred from the mover 328 to the surrounding environment can be controlled and optimized.

As provided herein, one or more characteristics of the first fluid 356 directed to the mover 328 are different from one or more characteristics of the second fluid 358 directed to the mover 328. In one embodiment, the temperature of the first fluid 356 directed to the first inlet 364A is different than the temperature of the second fluid 358 directed to the second inlet 366A. In alternative embodiments, the temperature of the second fluid 358 at the second inlet 366A can be at least approximately 2, 5, 10, 15 or more degrees Celsius lower than the temperature of the first fluid 356 at the first inlet 364A. With some of these designs, the second fluid 358 transfers the bulk of the heat from the conductor component 354 and the first fluid 356 insulates the circulation housing 379 from the heat of the conductors 382, and maintains the temperature of the outer shell 384A of the conductor component 354.

In one embodiment, the temperature of the first fluid 356 at the first inlet 364A is approximately equal to a room temperature of the room in which the mover combination 326 is located and the temperature of the second fluid 358 at the second inlet 366A is at least approximately 2 degrees Celsius less. For example, if the room temperature is approximately 23 degrees Celsius, the temperature of the first fluid 356 at the first inlet 364A is controlled to be approximately 23 degrees Celsius and the temperature of the second fluid 358 at the second inlet 366A can be controlled to be approximately 10 degrees Celsius.

In one embodiment, the flow rates of the fluids 356, 358 are controlled to be different. For example, in alternative embodiments, the flow rate of the first fluid 356 at the first inlet 364A can be at least approximately 1, 2, 3, 4, 5, 6, 7, 8, 9, 10, 15 liters per minute less than the flow rate of the second fluid 358 at the second inlet 366A. Stated another way, the flow rate of the first fluid 356 can be controlled to be at least approximately 10, 25, 50, 75 percent less than the flow rate of the second fluid 358.

In another embodiment, the composition of the first fluid 356 can be different from the composition of the second fluid 358. For example, the specific heat of the first fluid 356 can be different from that of the second fluid 358. In alternative embodiments, the specific heat of the first fluid 356 can be a factor of 1.2, 2, 2.5 or greater than the specific heat of the second fluid 358. As a example, the first fluid 356 can be water and the second fluid 358 can be Flourinert.

In one embodiment, the fluid source 360 includes (i) a first conduit 392 that connects the first fluid pump 388B and the first temperature adjuster 388C in fluid communication with the first passageway 364, and (ii) a second conduit 394 that connects the second fluid pump 390B and the second temperature adjuster 390C in fluid communication with the second passageway 366. The location, design and organization of these components can be varied.

The design of the conduits 392, 394 can be varied. In FIG. 3B, the first conduit 392 includes a first inlet tube 392A, a first inlet plenum 392B, a first outlet plenum 392C, and a first outlet tube 392D. The first inlet tube 392A connects the first fluid pump 388B in fluid communication with the first inlet plenum 392B, the first inlet plenum 392B connects the first inlet tube 392A in fluid communication with the first inlet 364A, the first outlet plenum 392C connects the first outlet 364B in fluid communication with the first outlet tube 392D, and the first outlet tube 392D connects the first outlet plenum 392C in fluid communication with the first temperature adjuster 388C.

Somewhat similarly, in FIG. 3B, the second conduit 394 includes a second inlet tube 394A, a second inlet plenum 394B, a second outlet plenum 394C, and a second outlet tube 394D. The second inlet tube 394A connects the second fluid pump 390B in fluid communication with the second inlet plenum 394B, the second inlet plenum 394B connects the second inlet tube 394A in fluid communication with the second inlet 366A, the second outlet plenum 394C connects the second outlet 366B in fluid communication with the second outlet tube 394D, and the second outlet tube 394D connects the second outlet plenum 394C in fluid communication with the second temperature adjuster 390C.

In one embodiment, at least a portion of the first conduit 392 substantially encircles and is substantially coaxial with the second conduit 394. For example, in alternative embodiments, at least approximately 5, 10, 15, 25, 50, 90, or 100 percent of the first conduit 392 substantially encircles the second conduit 394. Stated another way, in alternate examples, the first fluid 356 encircles at least approximately 5, 10, 15, 25, 50, 90, or 100 percent of second fluid 358 in the second conduit 394. With this design, the first fluid 356 in the first conduit 392 insulates the second conduit 394 to reduce the influence of the second fluid 358 on the surrounding environment and reduces heat transfer from the second fluid 358 to the surrounding environment. For example, in FIG. 3B (i) a portion of the first inlet tube 392A encircles and is coaxial with the second inlet tube 394A, (ii) the first inlet plenum 392B encircles the second inlet plenum 394B, (iii) the first outlet plenum 392C encircles the second outlet plenum 394C, and (iv) a portion of the first outlet tube 392D encircles and is coaxial with the second outlet tube 394D.

Figure 3C:
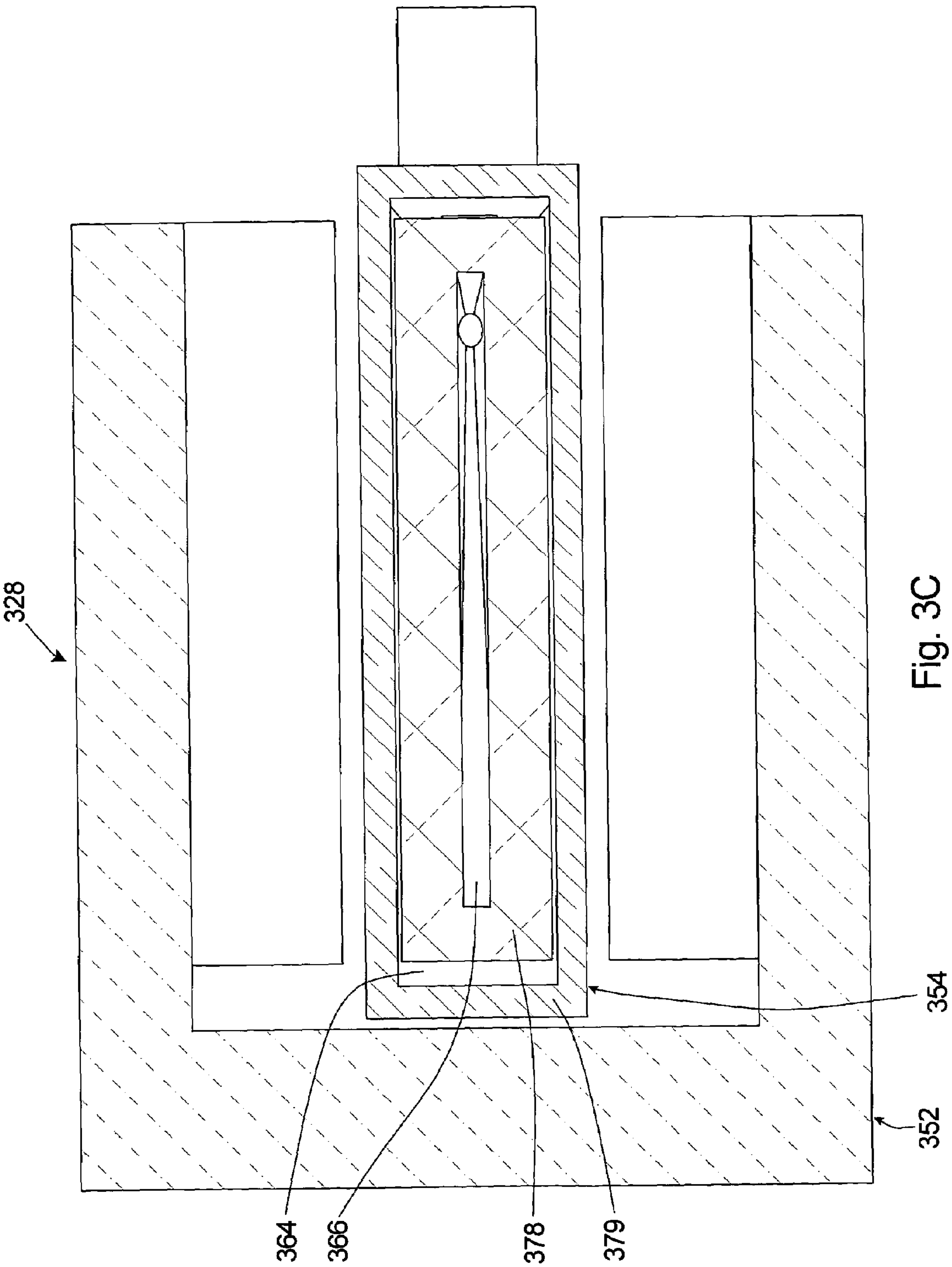
FIG. 3C is cutaway view taken on line 3C—3C in FIG. 3A.

FIG. 3C is cross-sectional view of the mover 328 including the magnet component 352 and the conductor component 354 taken on line 3C—3C in FIG. 3A. FIG. 3C illustrates that (i) the first passageway 364 encircles the conductor array 378 and the second passageway 366, (ii) the conductor array 378 encircles the second passageway 366, and (iii) the passageways 364, 366 are substantially coaxial. In alternate examples, at least approximately 5, 10, 15, 25, 50, 90, or 100 percent of the first passageway 364 encircles the second passageway 366. Stated another way, in alternate examples, the first fluid 356 encircles at least approximately 5, 10, 15, 25, 50, 90, or 100 percent of second fluid 358 in the conductor component 354. With design, the first fluid 356 in the first passageway 364 insulates a relatively large portion of the conductor array 378.

The size of each of the passageways 364, 366 can vary. For example, the first passageway 364 can be defined by a gap of between approximately 0.5 to 2 mm between the circulation housing 379 and the conductor array 378. Further, the second passageway 366 is rectangular shaped opening in the conductor array 378 having a width of approximately 80% or more of the width of conductor array 378 and a height of approximately 1 to 5 mm.

Figure 3D:
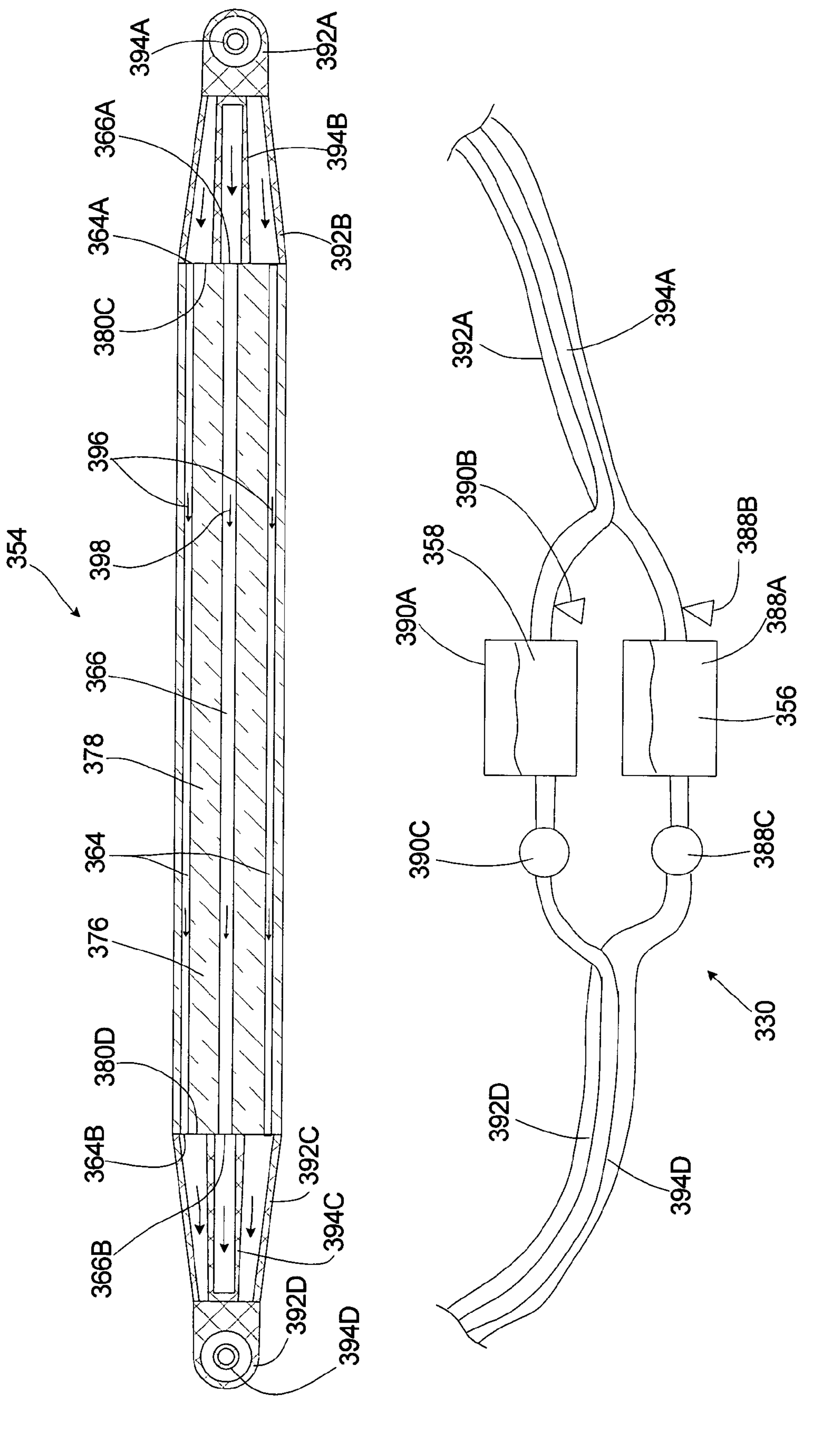
FIG. 3D is a cut-away view of a conductor component and a circulation system of FIG. 3A.

FIG. 3D is a cross-sectional view of the conductor component 354 of FIG. 3A and the circulation system 330. FIG. 3D illustrates the first inlet 364A, the first outlet 364B, the second inlet 366A and the second outlet 366B. FIG. 3D also illustrates that (i) the first passageway 364 encircles the conductor array 378 and the second passageway 366, (ii) the conductor array 378 encircles the second passageway 366, (iii) the passageways 364, 366 are substantially coaxial and concentric, (iv) the first inlet tube 392A encircles the second inlet tube 394A, (v) the first inlet plenum 392B encircles the second inlet plenum 394B, (vi) the first outlet plenum 392C encircles the second outlet plenum 394C, and (vii) the first outlet tube 392D encircles the second outlet tube 394D.

In FIG. 3D, the first fluid 356 is retained in the first reservoir 388A. Subsequently, the first pump 388B draws the first fluid 356 from the first reservoir 388A and directs the first fluid 356 sequentially through the first inlet tube 392A, the first inlet plenum 392B, the first passageway 364, the first outlet plenum 392C, the first outlet tube 392D, the first temperature adjuster 388C and back to the first reservoir 388A. Somewhat similarly, the second pump 390B draws the second fluid 358 from the second reservoir 390A, and directs the second fluid 358 sequentially through the second inlet tube 394A, the second inlet plenum 394B, the second passageway 366, the second outlet plenum 394C, the second outlet tube 394D, the second temperature adjuster 390C and back to the second reservoir 390A. Arrows designated 396 illustrate the flow of the first fluid 356 through the conductor component 354 and arrows designated 398 illustrate the flow of the second fluid 358 through the conductor component 354.

It should be noted that the location of the inlets 364A, 366A and the outlets 364B, 366B can be varied to influence the cooling of the conductor component 354. In the embodiment illustrated in FIG. 3D, first inlet 364A and the second inlet 366A are located near the first end 380C of the coil assembly 376 and the outlets 364B, 366B are located near the second end 380D of the coil assembly 376. Alternatively, one or both of the inlets 364A, 366A can be located near the second end of the coil assembly 376 or intermediate the ends 380C, 380D, and/or one or both of the outlets 364B, 366B can be located near the first end 380C of the coil assembly 376 or intermediate the ends 380C, 380D. Alternatively, for example, the single inlets 364A, 366A and the single outlets 364B, 366B, illustrated in FIG. 3D, can be replaced by multiple inlets and/or multiple outlets.

Figure 4A:
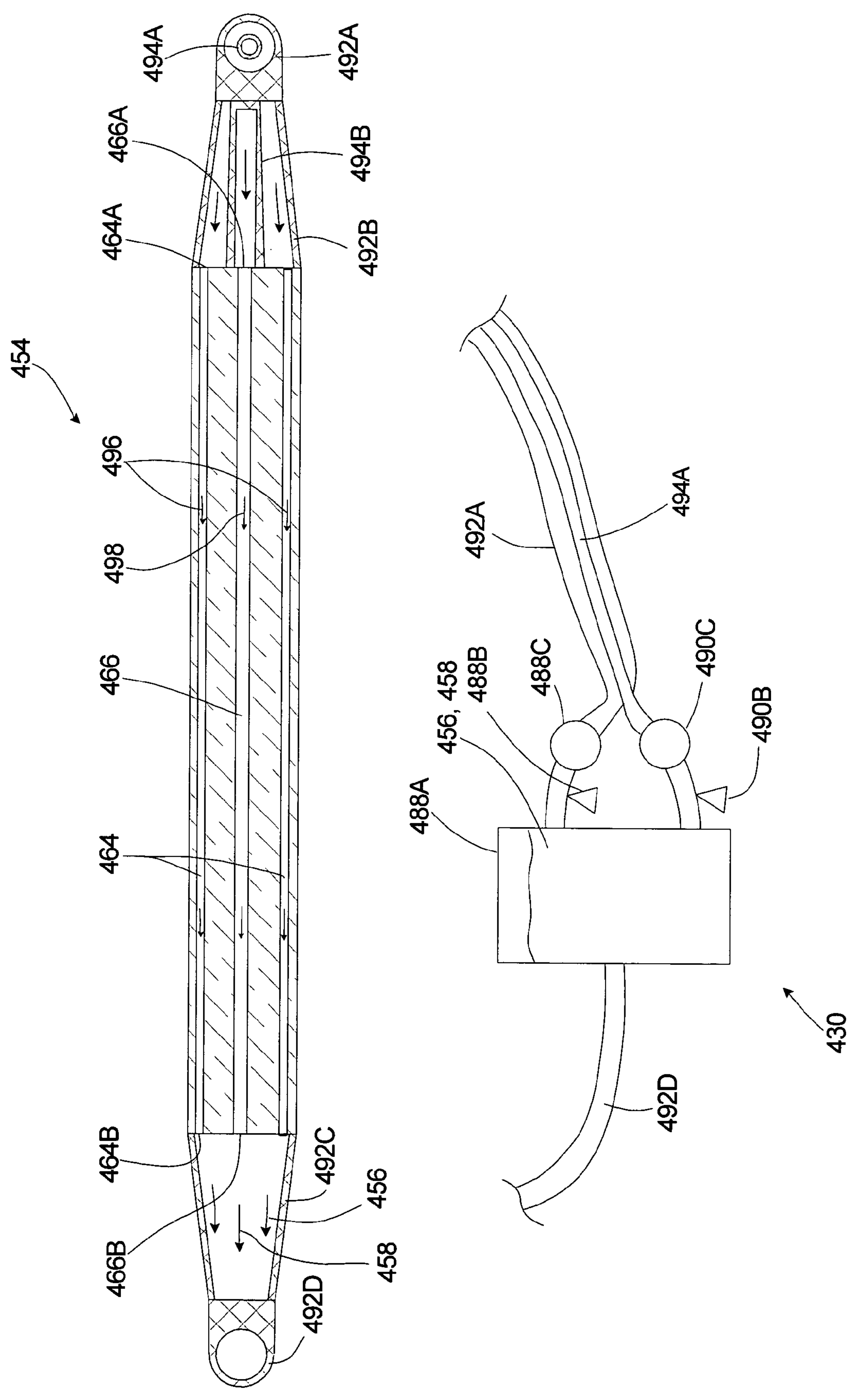
FIG. 4A is a cut-away view of an alternate embodiment of the conductor component and of the circulation system.

FIG. 4A is a cross-sectional view of a conductor component 454 and another embodiment of the circulation system 430. In this embodiment, the conductor component 454 is similar to the conductor component 354 described above and illustrated in FIG. 3D. More specifically, the conductor component 454 defines a first passageway 464 having a first inlet 464A and a first outlet 464B and a second passageway 466 having second inlet 466A and a second outlet 466B.

In FIG. 4A, the circulation system 430 again delivers a first fluid 456 to the first inlet 464A and a second fluid 458 to the second inlet 466A. However, in this embodiment, the first fluid 456 that exits from the first outlet 464B is combined with the second fluid 458 that exits from the second outlet 466B.

In one embodiment, temperature of the first fluid 456 at the first inlet 464A is higher than the temperature of the second fluid 458 at the second inlet 466A. As an example, in one embodiment, the temperature of the first fluid 456 at the first inlet 464A is approximately at room temperature, the temperature of the second fluid 458 at the second inlet 466A is less than room temperature, and the temperature of the combined fluid 456, 458 exiting the conductor component 454 is approximately at room temperature. As an example, the room temperature is approximately 23 degrees C., the temperature of the first fluid 456 at the first inlet 464A is approximately 22 degrees C., the temperature of the second fluid 458 at the second inlet 466A is approximately ten degrees C., and the temperature of the combined fluid 456, 458 is approximately twenty-three degrees C. In this embodiment, the temperature of the second fluid 458 is controlled so that the temperature of the combined fluid 456, 458 at the outlets 464B, 466B is approximately equal to the room temperature.

In FIG. 4A, the circulation system 430 can include a single reservoir 488A, a first pump 488B, a first temperature adjuster 488C, a second pump 490B, and a second temperature adjuster 490C. Further, in this embodiment, the circulation system 430 includes a first inlet tube 492A, a second inlet tube 494A that is encircled by the first inlet tube 492A, a first inlet plenum 492B, a second inlet plenum 494B that is encircled by the first inlet plenum 492B, an outlet plenum 492C and an outlet tube 492D that transports the combined fluid 456, 458 to the combined reservoir 488A.

In this embodiment, the first fluid 456 is drawn from the combined reservoir 488A with the first pump 488B, and sequentially directed through the first temperature adjuster 488C, through the first inlet tube 492A, the first inlet plenum 492B, and the first passageway 464. Similarly, the second fluid 458 is drawn from the combined reservoir 488A with the second pump 490B, and sequentially directed through the second temperature adjuster 490C, through the second inlet tube 494B, the second inlet plenum 494B, and the second passageway 466. The fluids 456, 458 combine after exiting the respective passageways 464, 466. The outlet plenum 492C and the outlet tube 492D transport the combined fluid 456, 458 to the reservoir 488A.

Arrows 496, 498 illustrate the flow of the fluids 456, 458 respectively in the conductor component 454.

Figure 4B:
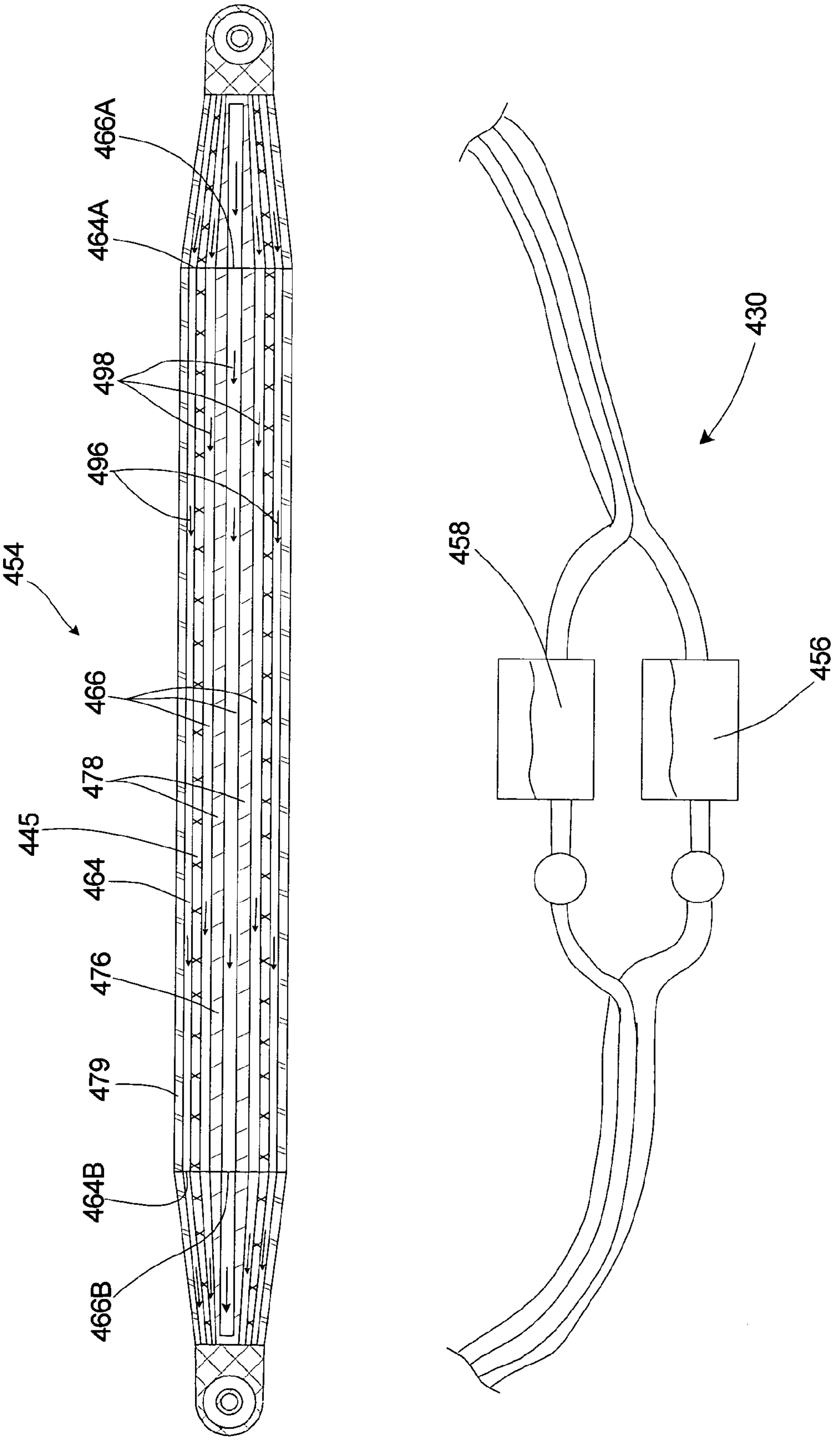
FIG. 4B is a cut-away view of another alternate embodiment of the conductor component and of the circulation system.

FIG. 4B is a cross-sectional view of the circulation system 430 and another embodiment of the conductor component 454. In this embodiment, (i) the circulation system 430 is similar to the circulation system 330 described above and illustrated in FIG. 3D, (ii) the conductor component 454 again defines a first passageway 464 having a first inlet 464A and a first outlet 464B and a second passageway 466 having second inlet 466A and a second outlet 466B, and (iii) the circulation system 430 again delivers a first fluid 456 to the first inlet 464A and a second fluid 458 to the second inlet 466A. However, in this embodiment, the conductor component 454 is slightly different than the conductor component 354 illustrated in FIG. 3D.

More specifically, in this embodiment, the conductor component 454 again includes two conductor arrays 478 and a gap between the two conductor arrays 478 defines the inner perimeter 480B. However, in this embodiment, a liner 445 encircles the conductor arrays 478. In FIG. 4B, the circulation housing 479 encircles the liner 445 and coil assembly 476. In this embodiment, the circulation housing 479 cooperates with the liner 445 to define the first passageway 464. Further, the second passageway 466 is defined by the opening in the coil assembly 476 and the space between the coil assembly 476 and the liner 445.

With this design, the first passageway 464 is not defined by the coil arrays 478 and heat is not directly transferred from the coil arrays 478 to the first fluid 456.

Arrows 496, 498 illustrate the flow of the fluids 456, 458 respectively in the conductor component 454.

Figure 5A:
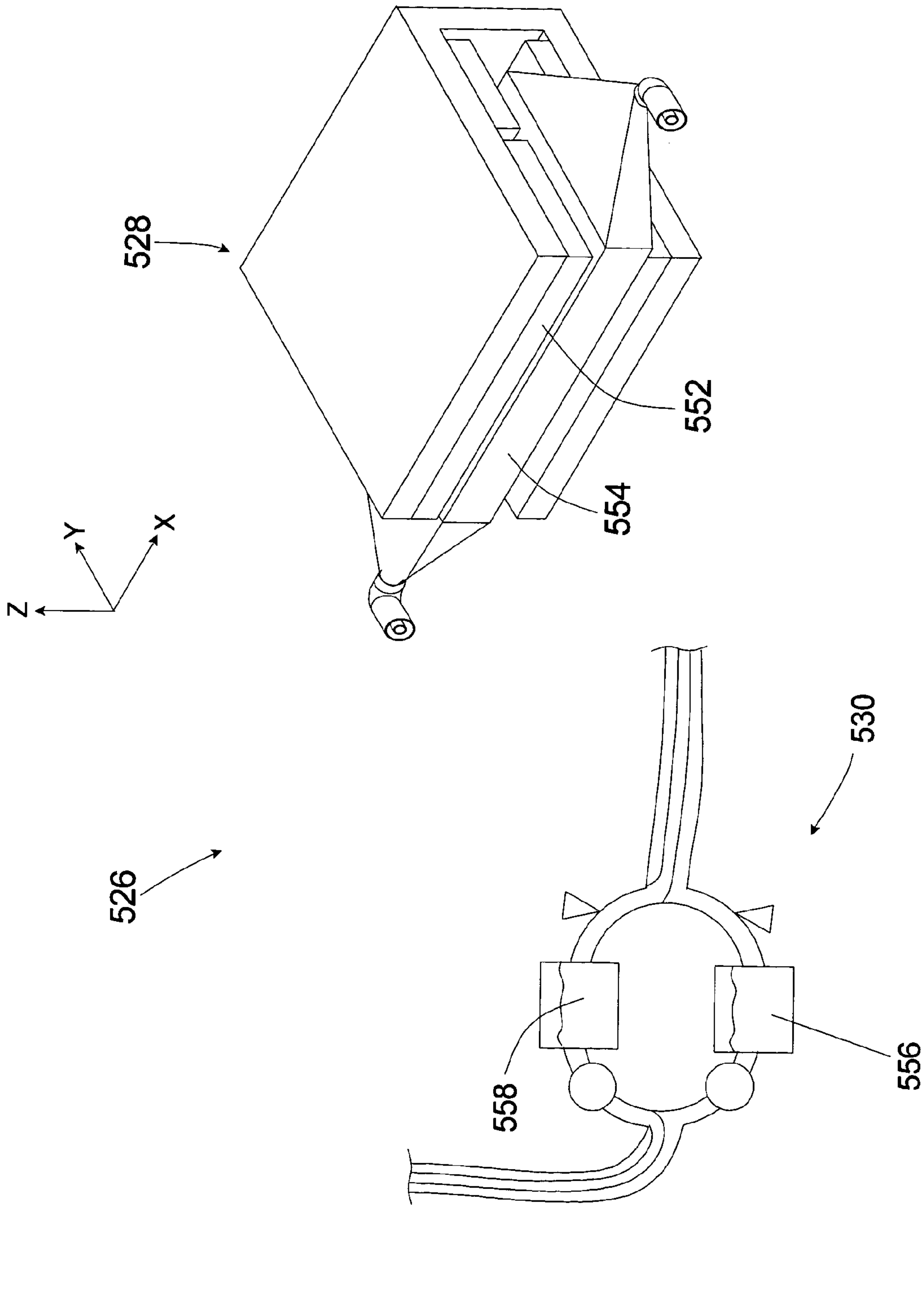
FIG. 5A is a perspective view of another embodiment of a mover assembly having features of the present invention.

FIG. 5A is a perspective view of another embodiment of a mover combination 526 including a mover 528 and a circulation system 530 having features of the present invention. In this embodiment, the mover 528 is a voice coil motor and includes a magnet component 552, and a conductor component 554 that interacts with the magnet component 552. A voice coil motor is a short stroke electromagnetic mover in which the current is a function of the required force only and not the relative position between the conductor and the magnet component. In FIG. 5A, the conductor component 554 moves linearly along the Y axis relative to the stationary magnet component 552. Further, the magnet component 552 and the conductor component 554 are shorter than the corresponding components described above. The circulation system 530 is similar to the circulation system 530 described above and illustrated in FIG. 3D. In particular, the circulation system 530 directs a first fluid 556 and a second fluid 558 to the mover 528.

Figure 5B:
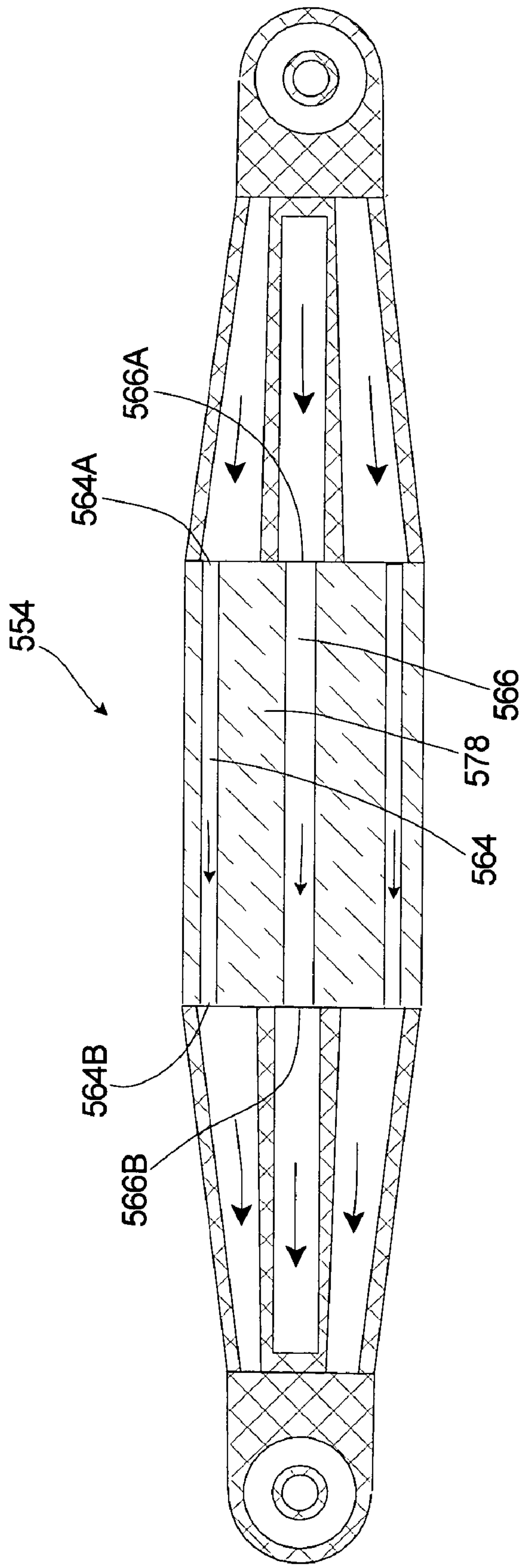
FIG. 5B is a cutaway view taken on line 5B—5B in FIG. 5A.

FIG. 5B is a cross-sectional view of the conductor component 554 of FIG. 5A. FIG. 5B illustrates the first inlet 564A, the first outlet 564B, the second inlet 566A and the second outlet 566B. FIG. 5B also illustrates that (i) the first passageway 564 encircles the conductor array 578 and the second passageway 566, (ii) the conductor array 578 encircles the second passageway 566, and (iii) the passageways 564, 566 are substantially coaxial and concentric.

Figure 6A:
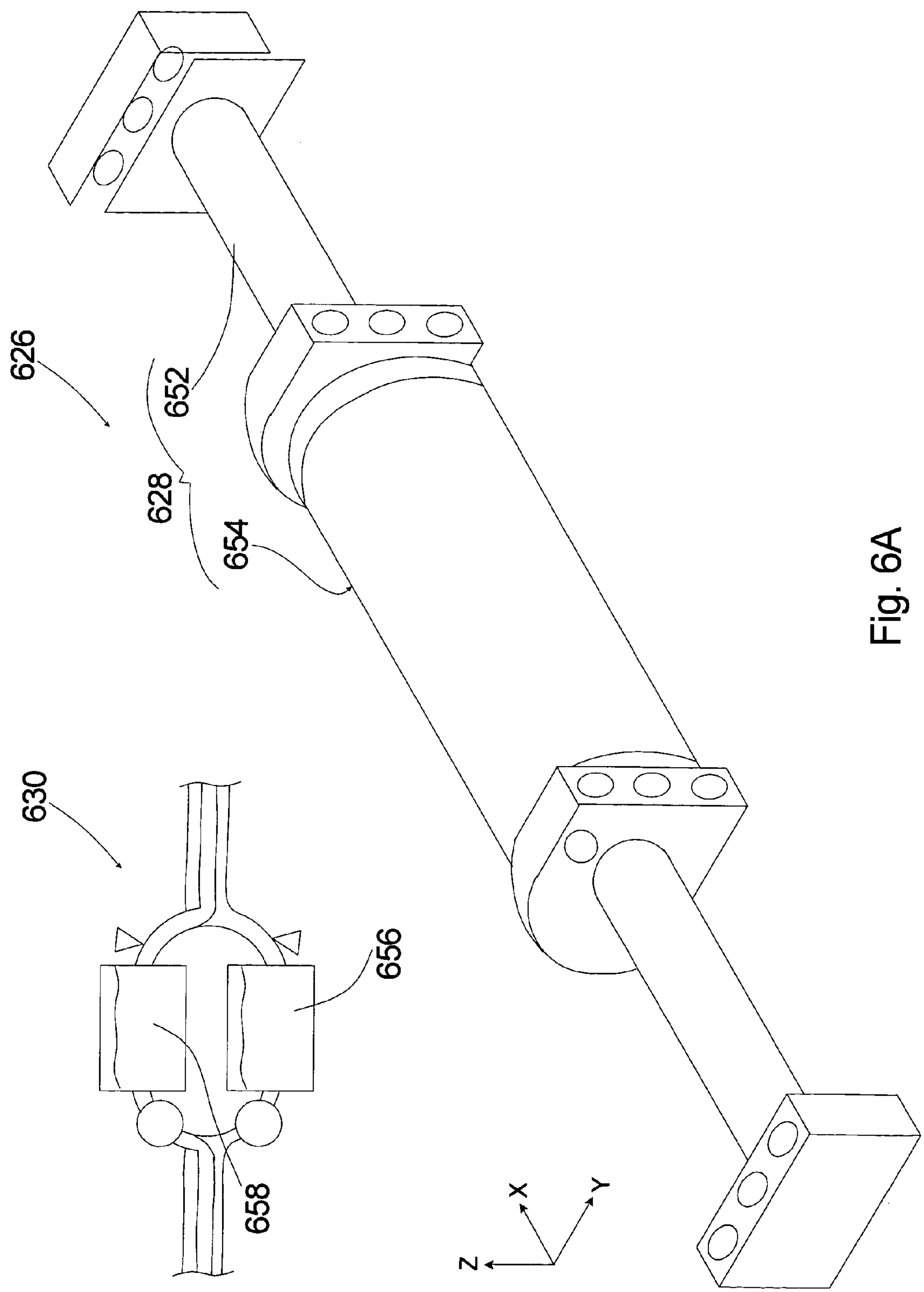
FIG. 6A is a perspective view of still embodiment of a mover assembly having features of the present invention.

FIG. 6A is a perspective view of another embodiment of a mover combination 626 including a mover 628 and a circulation system 630 having features of the present invention. In this embodiment, the mover 628 is a shaft type linear motor and includes a magnet component 652, and a conductor component 654 that interacts with the magnet component 652. In FIG. 6A, the conductor component 654 moves linearly along the X axis relative to the stationary magnet component 652. In this embodiment, the magnet component 652 is generally right cylindrical shaped. The circulation system 630 is similar to the circulation system 630 described above and separately directs a first fluid 656 and a second fluid 658 to the mover 628.

Figure 6B:
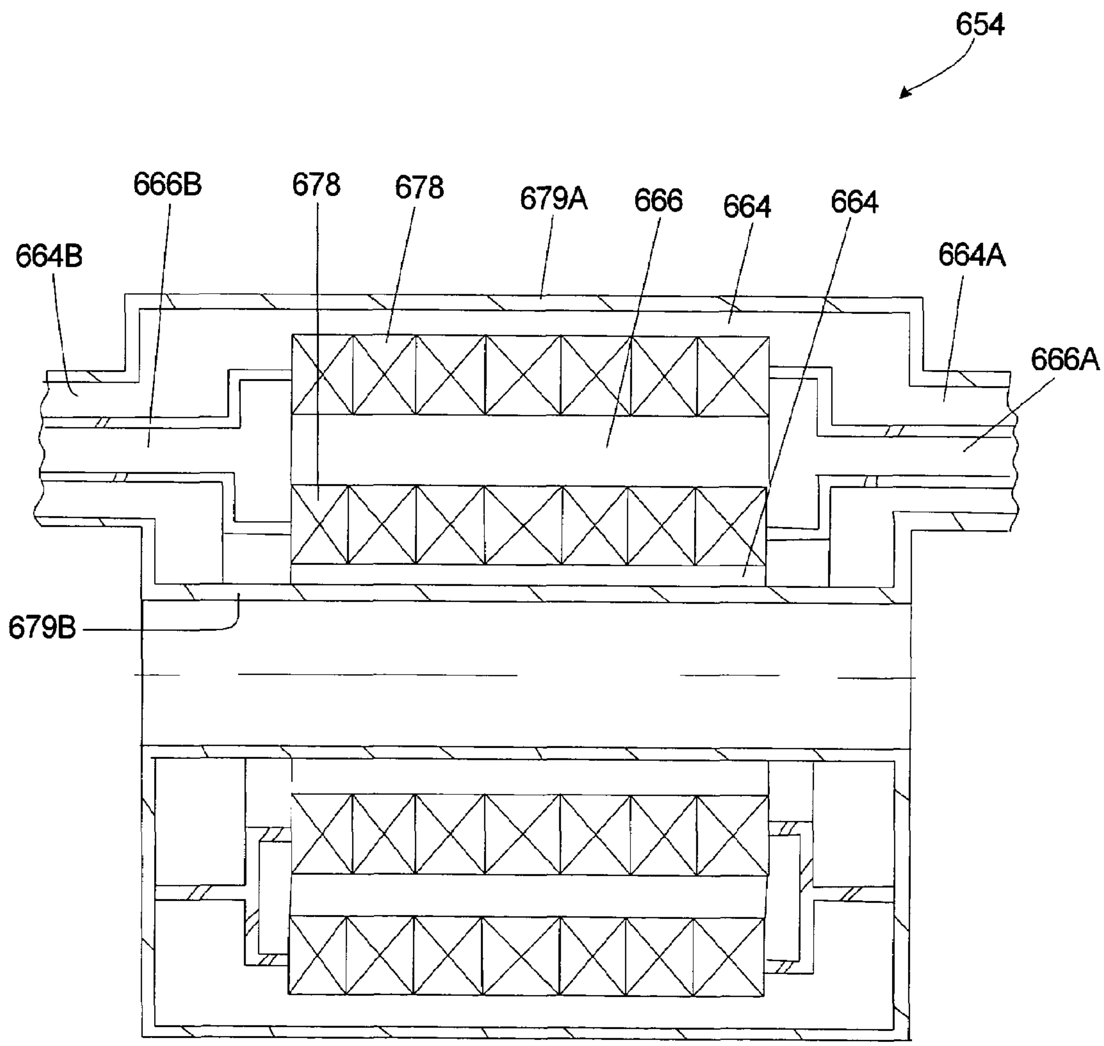
FIG. 6B is a cutaway view of a conductor component of FIG. 6A.

FIG. 6B is a cross-sectional view of the conductor component 654. FIG. 6B illustrates the first inlet 664A, the first outlet 664B, the second inlet 666A and the second outlet 666B. In this embodiment, the conductor component 654 is generally annular shaped and includes a generally annular shaped outer circulation housing 679A, a pair of coaxial, spaced apart, generally annular shaped conductor arrays 678 including a plurality of conductors, and a generally annular shaped inner circulation housing 679B. In this embodiment, the outer circulation housing 679A encircles the conductor arrays 678 and the inner circulation housing 679B, and the conductor arrays 678 encircle the inner circulation housing 679B. In this embodiment, (i) the first passageway 664 is defined by the annular shaped channel between the outer circulation housing 679A and the conductor arrays 678 and the annular shaped channel between the inner circulation housing 679B and the conductor arrays 678, and (ii) the second passageway 666 is defined by the annular shaped channel between the conductor arrays 678.

In this embodiment, (i) a portion of the first passageway 664 encircles the conductor arrays 678 and the second passageway 666, (ii) a portion of the first passageway 664 is encircled by the conductor arrays 678 and the second passageway 666, (iii) the conductor arrays 678 encircle the second passageway 666, and (iv) the passageways 664, 666 are substantially coaxial and concentric.

Figure 7A:
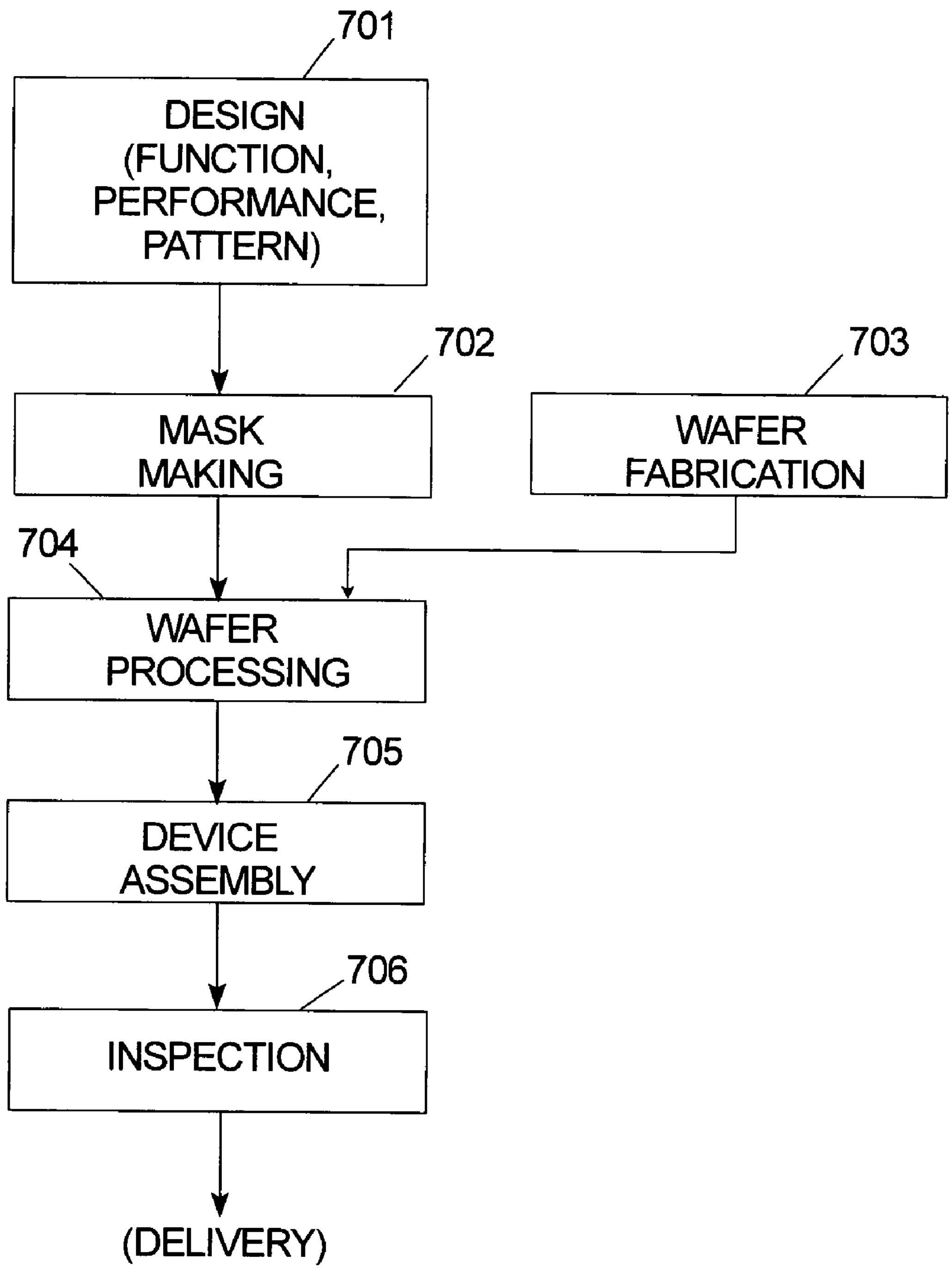
FIG. 7A is a flow chart that outlines a process for manufacturing a device in accordance with the present invention.

Further, semiconductor devices can be fabricated using the above described systems, by the process shown generally in FIG. 7A. In step 701 the device's function and performance characteristics are designed. Next, in step 702, a mask (reticle) having a pattern is designed according to the previous designing step, and in a parallel step 703 a wafer is made from a silicon material. The mask pattern designed in step 702 is exposed onto the wafer from step 703 in step 704 by a photolithography system described hereinabove in accordance with the present invention. In step 705 the semiconductor device is assembled (including the dicing process, bonding process and packaging process), finally, the device is then inspected in step 706.

Figure 7B:
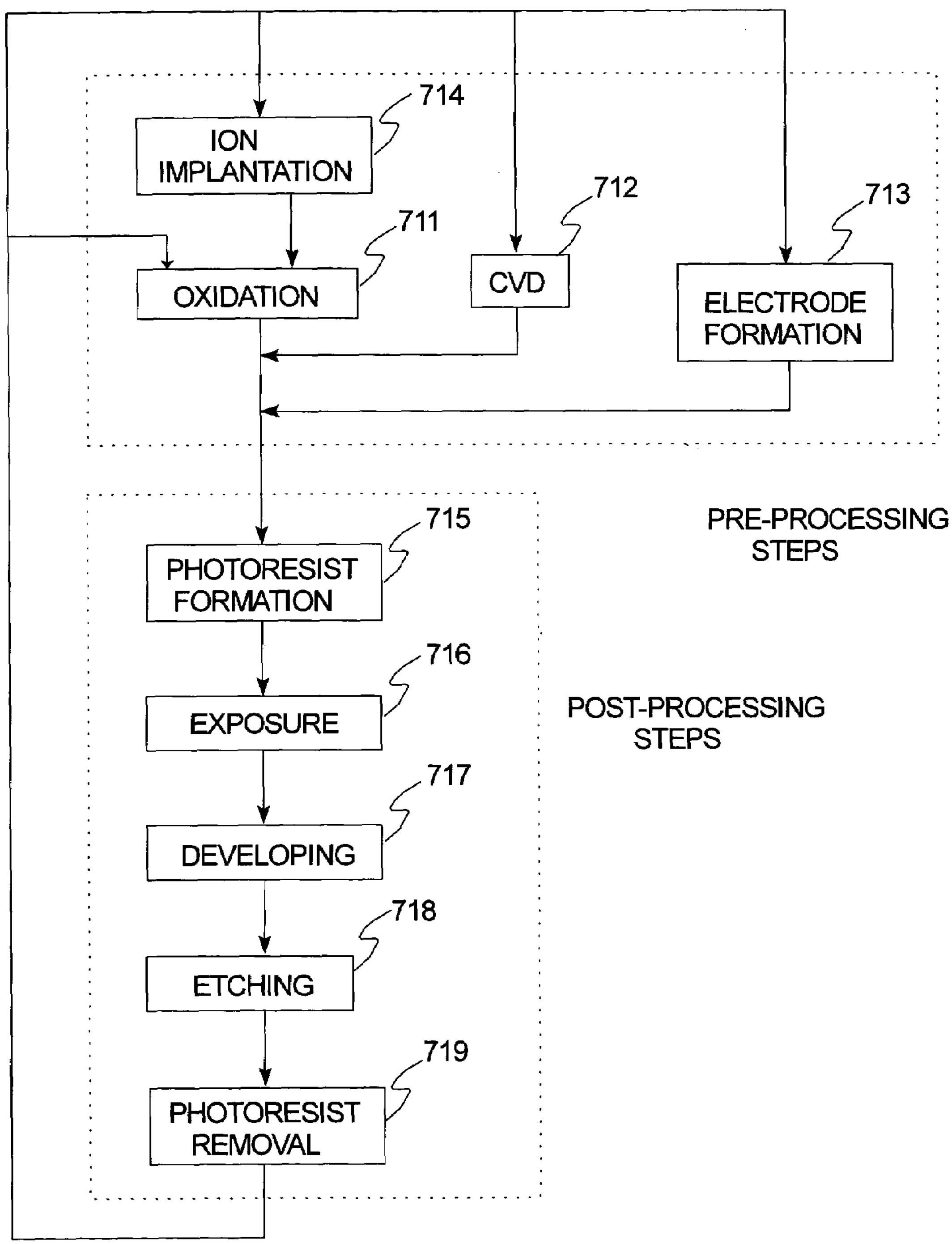
FIG. 7B is a flow chart that outlines device processing in more detail.

FIG. 7B illustrates a detailed flowchart example of the above-mentioned step 704 in the case of fabricating semiconductor devices. In FIG. 7B, in step 711 (oxidation step), the wafer surface is oxidized. In step 712 (CVD step), an insulation film is formed on the wafer surface. In step 713 (electrode formation step), electrodes are formed on the wafer by vapor deposition. In step 714 (ion implantation step), ions are implanted in the wafer. The above mentioned steps 711–714 form the preprocessing steps for wafers during wafer processing, and selection is made at each step according to processing requirements.

At each stage of wafer processing, when the above-mentioned preprocessing steps have been completed, the following post-processing steps are implemented. During post-processing, first, in step 715 (photoresist formation step), photoresist is applied to a wafer. Next, in step 716 (exposure step), the above-mentioned exposure device is used to transfer the circuit pattern of a mask (reticle) to a wafer. Then in step 717 (developing step), the exposed wafer is developed, and in step 718 (etching step), parts other than residual photoresist (exposed material surface) are removed by etching. In step 719 (photoresist removal step), unnecessary photoresist remaining after etching is removed.

Multiple circuit patterns are formed by repetition of these preprocessing and post-processing steps.

As provided herein, in one embodiment, the circulation system maintains the outer surface of each motor at a set temperature. This reduces the effect of the motors on the temperature of the surrounding environment. This also allows the measurement system to take accurate measurements of the position of the stages. As a result thereof, the quality of the integrated circuits formed on the wafer is improved.

While the particular mover combination 26 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A mover combination comprising (i) a mover having a magnet component, a conductor component, a first passageway, a second passageway, a first inlet that is in fluid communication with the first passageway, and a second inlet that is in fluid communication with the second passageway, and (ii) a circulation system comprising: a fluid source that directs a first fluid into the first inlet and a second fluid into the second inlet, the fluid source including a first conduit that transports the first fluid toward the first inlet and a second conduit that transports the second fluid toward the second inlet, wherein at least a portion of the second conduit is encircled by the first conduit; wherein the first passageway encircles at least a portion of the second passageway, and wherein the conductor component includes a conductor array and wherein the first passageway encircles at least a portion of the conductor array and the conductor array encircles at least a portion of the second passageway.

2. The mover combination of claim 1 wherein a temperature of the second fluid at the second inlet is different than a temperature of the first fluid at the first inlet.

3. The mover combination of claim 2 wherein the temperature of the first fluid at the first inlet is at least approximately 5 degrees C. greater than the temperature of the second fluid at the second inlet.

4. The mover combination of claim 2 wherein the temperature of the first fluid at the first inlet is at least approximately 10 degrees C. greater than the temperature of the second fluid at the second inlet.

5. The mover combination of claim 1 wherein at least approximately 10 percent of the second conduit is encircled by the first conduit.

6. The mover combination of claim 1 wherein at least approximately 50 percent of the second conduit is encircled by the first conduit.

7. The mover combination of claim 1 wherein the mover is positioned in a room that is at a room temperature, and wherein a temperature of the first fluid at the first inlet is approximately equal to the room temperature.

8. An isolation system including the mover combination of claim 1.

9. A stage assembly including the mover combination of claim 1.

10. An exposure apparatus including the mover combination of claim 1.

11. An object on which an image has been formed by the exposure apparatus of claim 10.

12. A semiconductor wafer on which an image has been formed by the exposure apparatus of claim 10.

13. A mover combination comprising:

a mover having a magnet component, a conductor component including a conductor array, a first passageway including a first inlet, and a second passageway including a second inlet, wherein the first passageway encircles at least a portion of the conductor array and the conductor array encircles at least a portion of the second passageway; and a circulation system including a fluid source that directs a first fluid to the first inlet and a second fluid to the second inlet, wherein a temperature of the first fluid at the first inlet is different than a temperature of the second fluid at the second inlet, and wherein the first inlet is in fluid communication with the first passageway and the second inlet is in fluid communication with the second passageway.

14. The mover combination of claim 13 wherein the circulation housing cooperates with the conductor component to define the first passageway.

15. The mover combination of claim 13 wherein the second passageway is formed by an opening in the conductor component.

16. The mover combination of claim 13 wherein the first passageway and the second passageway are substantially coaxial.

17. The mover combination of claim 13 wherein the first passageway is not in fluid communication with the second passageway.

18. The mover combination of claim 13 wherein the temperature of the first fluid and the temperature of the second fluid are controlled to precisely control a temperature of an outer surface of the conductor component.

19. The mover combination of claim 13 wherein the fluid source includes a first conduit that transports the first fluid to the first inlet and a second conduit that transports the second fluid to the second inlet, wherein at least a portion of the second conduit is encircled by the first conduit, and wherein the first conduit and the second conduit are substantially coaxial.

* * * * *